US00RE35272E

United States Patent [19]

Mathieson et al.

[11] E Patent Number: Re. 35,272

[45] Reissued Date of Patent: Jun. 11, 1996

[54] APPARATUS AND METHOD FOR LINING LANDFILLS, RESERVOIRS, HAZARDOUS WASTE DISPOSAL SITES AND THE LIKE

[75] Inventors: Michael C. Mathieson, Kingwood; Mark W. Cadwallader, Conroe, both of Tex.

[73] Assignee: GSE Lining Technology, Inc., Houston, Tex.

[21] Appl. No.: 292,793

[22] Filed: Aug. 18, 1994

Related U.S. Patent Documents

Reissue of:

[64] Patent No.: 5,139,853
Issued: Aug. 18, 1992
Appl. No.: 689,962
Filed: Apr. 23, 1991

[51] Int. Cl.[6] ..... B32B 7/02

[52] U.S. Cl. ..... 428/213; 428/131; 428/515; 428/516

[58] Field of Search ..... 428/516, 215, 428/515, 213, 131; 405/128, 129

[56] References Cited

U.S. PATENT DOCUMENTS

| | | | |
|---|---|---|---|
| Re. 32,103 | 4/1986 | Struve | 156/153 |
| 4,501,788 | 2/1985 | Clem | 428/240 |
| 5,221,570 | 6/1993 | Gokcen et al. | 428/215 |

OTHER PUBLICATIONS

"Methods to Evaluate the Stress Crack Resistance of High Density Polyethylene FML Sheets and Seams," by Y. H. Halse et al., 16th Annual Research Symposium of the U.S. EPA, Apr. 1990.

"Comparison of White Versus Black Surfaces for Energy Conservation," by Donald E. Backenstow, NRCA/NBS 8th Conf. on Roofing Tech., Apr. 1987.

Advertisement with heading "Every Field has its Expert Problem Solver".

Advertisement with heading "Installation Systems".

"Coextruded HDPE/VLDPE Multilayer Geomembranes," Gary M. Kolbasuk, pp. 228–238, Proceedings of 4th GRI Seminar on Landfill Closures: Geosynthetics, Interface Friction & New Developments, Dec. 13, 1990.

American Standard Testing Material (ASTM) "Standard Specification for Polyethylene Plastics Molding & Extrusion Materials," D 1248–84 (1984), pp. 582–591.

CRC Handbook of Chemistry and Physics, 65th Ed., Weast, Ed., 1984–85 pp. E–379–E–382.

"Geomembranes Air Large Scale Floating Cover Anaerobic Digesters" M. Cadwallader & M. C. Mathieson, Paper Age, (Jun. 1988), pp. 27; 36.

"Rate Process Method as a Practical Approach to a Quality Control Method for Polyethylene Pipe," E. F. Palermo, pp. 96–101.

"Anomalies in the Rate Process Method of Analyzing Polyethylene Pipe Data," R. L. Ayres, pp. 206–211.

Niederberg–Chemie GmbH CARBOFOL® brochure entitled "Tunnel construction using CARBOFOL® Waterproofing Membranes," undated, pp. 1–16.

Intercodam Bouwstoffen BV CARBOFOL® brochure entitled, "Environmental protection Geomembranes for earthwork and waste pit construction," undated.

CARBOFOL® brochure entitled, "Umweltschutz Kunststoff–Dichtungs–bahnen für Deponiebau, Altlastensanierung und Klärteiche," undated.

*Primary Examiner*—Edith Buffalow
*Attorney, Agent, or Firm*—Arnold, White & Durkee

[57] ABSTRACT

An improved method and a product for waterproofing soil utilizing a flexible plastic sheet for providing a water barrier and for providing a means of reflecting light sufficient to prevent damage to the sheet and the underlying soil from direct sunlight comprising a uniform density or multiple-density plastic sheet material which has been manufactured to a desired thickness to contain an upper surface cpable of reflecting light.

46 Claims, 1 Drawing Sheet

APPARATUS AND METHOD FOR LINING LANDFILLS, RESERVOIRS, HAZARDOUS WASTE DISPOSAL SITES AND THE LIKE

Matter enclosed in heavy brackets [ ] appears in the original patent but forms no part of this reissue specification; matter printed in italics indicates the additions made by reissue.

BACKGROUND OF THE INVENTION

This invention relates to an improved method and apparatus for lining reservoirs, waste landfills, hazardous waste disposal sites, outdoor fluid containment areas and other similar applications. Specifically, the present invention relates to a moisture impervious thermoplastic sheet or liner particularly suitable for environmental pollution control as a water barrier for the building of waste landfills, ponds, reservoirs, lagoons and as a soil sealant for hazardous or nuclear waste and capable of resisting expansion, contraction, wrinkling, bridging, deformation, and stress cracking due to thermal changes in the plastic sheet upon exposure to direct sunlight or incident radiation. This invention also has the stated advantage of reducing desiccation of the subgrade clay layer below the liner caused by heating of the liner, thereby increasing liner longevity.

Darkly pigmented plastic or thermoplastic sheets or films have been utilized to seal the soil at landfills or hazardous waste sites by laying the plastic sheeting along the ground with the seams overlapped and welded or cemented by known methods. Various bentonit-containing sheet barriers also exist for use as liners for extremely large areas such as ponds, lagoons and hazardous waste sites.

Landfills, lagoons or other waste ponds are typically constructed by excavating land to create a reservoir area. If desired, berms can then be built around the perimeter of the reservoir area to extend the walls of the reservoir above ground level. Quite often, the landfill, lagoon or waste site is next lined with a layer of clay to serve as a barrier. For example, environmental regulations typically require a subgrade clay layer of uniform thickness (e.g., five feet) and uniform water content. As a final step, a thermoplastic liner is installed by, for example, placing dark-pigmented high density polyethylene ("HDPE") or dark-pigmented medium density polyethylene ("MDPE") plastic sheets over the entire surface of the reservoir soil and berm area in an overlapped abutting fashion, and then welding or cementing the sheets together to create a water impermeable liner. An exemplary method of welding plastic materials, such as plastic abetting, is et of forth in U.S. Pat. No. Re. 32,103 assigned to Gundie Lining Systems Inc. The liner can then be covered, if desired, with a protective layer of earth to provide protection of the liner from puncturing and to help keep the liner in place.

The waste, liquid, sludge material or the like is then placed on top of the plastic sheeting which is lining the landfill, reservoir, lagoon or pond. The landfill, reservoir, lagoon or pond is subject to water or fluid level changes, thereby leaving the dark-pigmented plastic liner vulnerable to direct exposure to sunligh, particularly along the sidewalls of the landfill or berm areas. Exposure to the sunlight causes the dark-pigmented plastic liner to heat up and winkle, buckle, bridge, or deform due to the thermal characteristics of the plastic. Such wrinkling or buckling causes stress to be placed on the plastic sheets and-the seams between each plastic sheet, thereby damaging or potentially damaging the seal created by the liner. In addition, the higher temperatures caused by black absorbance of infrared radiation accelerates stress cracking. Thus, thermal stress cracking of the plastic liner is an existing problem in the hazardous waste liner industry. The applicants have determined that stress cracking is greatly accelerated as the temperature of the liner increases (i.e., for approximately every 11° F. increase in temperature, the stress crack growth rate doubles).

The polyethylene lines are darkly-pigmented because they contain carbon black of sufficiently high concentration (i.e. approximately 2–3%) to help prevent damage to the plastic due to incident untraviolet radiation from the sun. However, the dark pigmentation absorbs heat thereby causing thermal damage to the plastic. Stress cracking is initiated and stress cracks are propagated in a HDPE layer under the stress of heat and tension.

Additionally, the heat generated from exposing the dark-pigmented plastic to incident radiation causes the underlying clay layer to dehydrate and crack, thereby causing damage to the functional and structural seal integrity of the lagoon, reservoir or pond. Desiccation of clay subgrades is a current problem in landfill or waste site construction. This subgrade desiccation dehydrates the subgrade clay layer near the top surface of the containment area berm. The soil moisture evaporates under a temperature gradient into air pockets existing the underside of the plastic liner and the clay. The soil moisture then condenses on the underside of the plastic liner and drains down-gradient on the berm slope toward the bottom of the berm. The subgrade clay layer no longer maintains uniform moisture content and will continue to develope cracks and fissures which destroy the desired impermeability of the clay layer. Thus, the plastic liner must be removed so that the clay layer can be restored to the required uniform moisture content. Such restoration efforts are costly and time consuming.

Therefore, particularly where hazardous wastes are involved, the appearance of any abnormalities in the plastic liner or clay layer of the waste pond will cause concern that the waste containment area is not functioning properly and will likely result in substantial time and money investments to alleviate such abnormalities.

Heretofore, the plastic sheets used for lining waste sites, ponds or lagoons were constructed out of a dark-pigmented plastic material, such as HDPE. Such plastic sheeting is available in varying thickness, width, and length. For example, Gundie Lining Systems, Inc., Houston, Tex., provides 250 foot long rolls of 100 mil thick, 22.5 feed width, dark-pigmented high density polyethylene plastic sheeting under the label "Gundline HD" for use in such applications.

Additionally, the exposed surface of the plastic sheeting can also be roughened, for example, by creating turbulence in the outer layers of the sheet during manufacture, leaving asperities in the sheet surface making it rough and therefore skid-resistant for those walking on the surface.

The dark pigmentation of the HDPE plastic liners posses desirable characteristics, such as, a carbon black content and distribution which is useful in blocking ultraviolet initiated oxidative degradation. For example, carbon black concentration inhibits the formation of free radicals and carbonyl groups which could otherwise form in polyethylene upon exposure to ultraviolet light, thereby preventing the free radicals and carbonyl groups from catalyzing the chain reaction breaking of the polyethylene bonds. However, the dark pigmentation of this HDPE plastic sheeting acts like a solar collector, absorbing sunlight or incident radiation thereby building up heat and causing damage to the plastic sheeting. While exposed plastic liners can be protected from sunlight by covering the liner with dirt, this procedure may not be desirable or practical, and may limit the ability to visually inspect the exposed portions of the liner for any tears or other undesirabic perforations or leaks. Sections of lined landfills are typically left exposed until the section is ready for waste disposal which may not be for several years. Even if a layer of dirt is placed on the exposed plastic liner, this dirt may become dislodge and washed away over time.

HDPE liners are highly desirable to the waste containment industry primarily because they possess desirable chemical resistance and strength. However, the use of HDPE reduces the liner's flexibility and elasticity thereby reducing the liners ability to absorb stress and resist cracking. More flexible liners such as very low density polyethylene ("VLDPE") are therefore attractive in certain applications, but if used alone, would compromise the chemical resistance and strength of the liner.

HDPE, MDPE and VLDPE are available in pellet form from a variety of manufacturers. It should be noted that there is not presently an American Standard Testing Material (ASTM) standard for VLDPE. ASTM standard D 1248-84 provides that polethylene is identified primarily on the basis of density and flow rate. This ASTM standard also notes the present categorization of polyethylene density (as calculated by ASTM testing protocols): Type I-"Low Density" (0.910 to 0.925 gram/cm$^3$); Type II-"Medium Density" (0.926 to 0.940 gram/cm$^3$); Type III-"High Density" (0.941 to 0.959 gram/cm$^3$); and Type IV-"High Density" (0.960 and higher). It should be further noted that in the plastics industry, a polyethylene may actually be called "High Density" without actually fitting the ASTM standard. As used herein, the term HDPE is intended to include polyethylene having a preferred density range of between 0.93 and 0.96 gram/cm$^3$ (as calculated by ASTM procedures) though higher density values may be utilized. As used herein, the term VLDPE is intended to include polyethylene having a preferred density range of between 0.89 and 0.92 gram/cm$^3$ (as calculated by ASTM testing procedures) though lower values may be utilized. As used herein, the term MDPE refers to polyethylene having a density falling between HDPE and VLDPE densities.

Additionally, it is difficult to visually detect any tears, rips, cracks, perforations, punctures or other potential leak forming channels in the surface or seams of dark-pigmented plastic sheeting. Furthermore, the dark pigmented plastic sheeting does not accept paint, thereby preventing or inhibiting the use of a light-reflective paint on the exterior of the plastic sheeting to prevent the heat buildup when the sheeting is exposed to sunlight.

In accordance with the present invention, a method and apparatus are provided which will allow formation of an improved fluid impenetrable flexible plastic sheet or geomembrane which will sufficiently reflect sunlight or incident radiation in order to resist thermal expansion, contraction, and cracking when exposed to direct sunlight, will arrest crack propagation, will inhibit subgrade desiccation, and will be suitable for use over large outdoor fluid containment areas by covering the soft or other areas with the improved plastic sheet.

SUMMARY OF INVENTION

The present invention addresses the problems described above by providing an improved method and apparatus for lining reservoirs, hazardous waste disposal sites and other similar applications. The invention generally comprises a flexible light reflective plastic sheet of uniform density or multiple density for use as a terntrier liner for waste materials.

In a preferred embodiment, the invention comprises a multi-pigmented flexible moisture impervious plastic sheet particularly suitable for environmental pollution control as a water barrier for the building of landfills, ponds, reservoirs, lagoons and as a soil sealant for hazardous or nuclear waste and capable of resisting expansion, contraction, wrinkling, deformation, cracking, structural damage and the like, and capable of inhibiting desiccation of the subgrade clay layer, all due to thermal changes in the sheet when exposed to direct sunlight.

In one preferred embodiment, the plastic sheet material of the present invention has been manufactured to a uniform density of a desired thickness to contain an upper surface capable of reflecting light. Preferably, the uniform density plastic sheeting is of a HDPE material.

In another preferred embodiment, the upper surface of the uniform density flexible plastic sheet encompasses about ten percent (10%) to twenty percent (20%) of the overall thickness of the plastic sheet.

In another preferred embodiment of the invention, a composite plastic liner is disclosed u tillzing a multi-density moisture impervious sheet having enhanced flexibility to reduce or arrest crack propagation, and having an upper surface capable of reflecting light.

In yet another preferred embodiment, the multi-density moisture impervious sheet or liner comprises an upper layer surface of HDPE, a central core layer of VLDPE, and an underside layer of HDPF, MDPE, or other polyethylene of a density greater than the VLDPE density.

In another embodiment of the multi-density liner, it is preferred that the VLDPE layer be at least three times the thickness of the upper and underside polyethylene layers. For example, in a preferred embodiment the upperside and underside HDPE layers are each 10 mil in thickness, while the core VLDPE layer is 40 mil in thickness.

In another preferred embodiment of the multi-density liner, both the upper layer and underside layer are light reflective HDPE to allow for versatility when installing the liner.

In still another preferred embodiment, the light-pigmented surface of this invention contains a pigmentation capable of reflecting more light than it absorbs.

In another preferred embodiment of this invention, the upper surface of the plastic sheet or liner is pigmented with a pigment having a coefficient of reflection between 0.5 and 1.0.

In another preferred embodiment of the invention, the upper suface of the plastic sheet contains white pigmentation, such as a titanium oxide dye, to reflect sunlight thereby reducing the thermal changes in the sheet due to exposure to direct sunlight.

In yet another preferred embodiment of this invention, the upper surface of the plastic sheet or liner is roughened.

In another preferred embodiment of this invention, the upper surface of the plastic sheet or liner is ultraviolet light stabilized.

The multi-pigmented flexible plastic beeting of this invention can be employed to waterproof an area of soil by covering the soil to be waterproofed with a plurality of the flexible plastic sheets with the upper light reflective surface facing up. The sheet, are then aligned in an overlapped abutting fashion to create a seam region between adjoining sheets. The abutting sheets are permanently joined by techniques such as extrusion welding, in order to provide a continuous and uninterrupted water impervious barrier of plastic. The outer edge of the permanently joined multi-pigmented sheets, or thermoplastic liner is then fixedly attached to the ground.

While the invention will be described in conjunction with specific embodiments thereof, it will be understood that it is not intended to limit the invention to that embodiment and procedure. On the contrary, it is intended to cover all alternatives, modifications and equivalents as may be included within the spirit of the invention as defined by the appended claims.

DETAILED DESCRIPTION OF THE PREFERRED EMBODIMENTS

Figure 1:
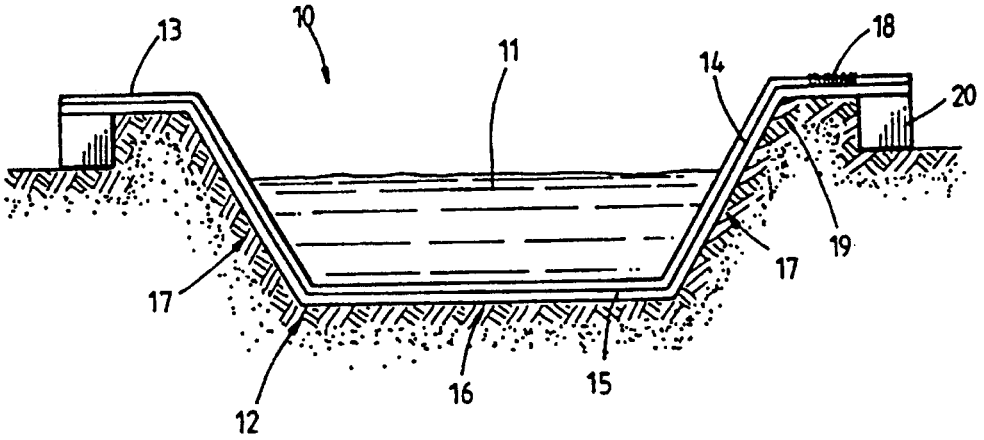
FIG. 1 is a sectional view of a landfill, hazardous waste disposal pond, reservoir or lagoon in accordance with one preferred embodiment of the present invention.
Figure 2:
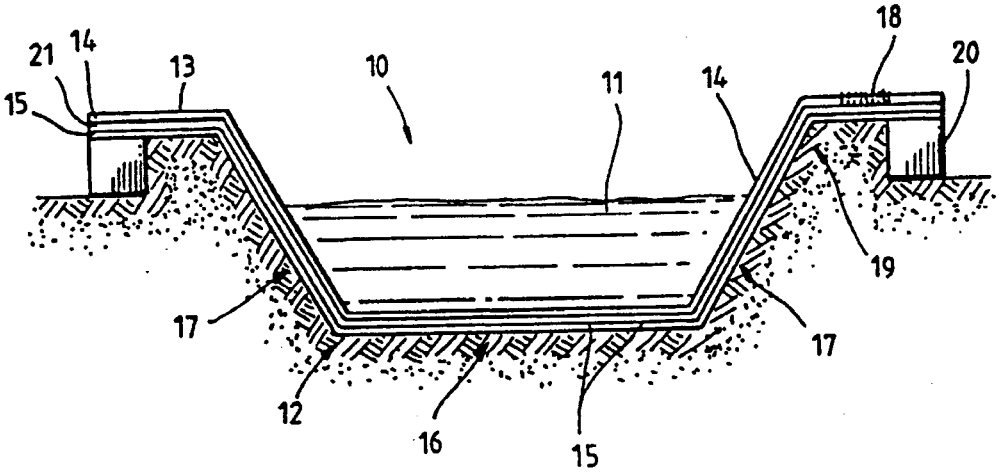
FIG. 2 is a sectional view of a landfall, hazardous waste disposal pond, reservoir, or lagoon in accordance with another preferred embodiment of the present invention.

Referring to FIGS. 1 and 2, there is shown a hazardous waste site or outdoor fluid containment area utilizing the products and methods of the present invention. Hazardous waste site or containment area 10 may contain may contain any number of contaminants and water soluble pollutants. It may be a liquid as shown, or a sludge, or a solid, or a combination thereof, for example, as is usually found at a waste landfill. The soil 12 is any type of porous soil or soil which one desires to protect from contamination. The outdoor fluid containment area 10 is lined with a water impermeable plastic sheet or thermoplastic liner 13 having a bottom 16 and sidewalls 17 comprising an inclined portion covering the sidewalls and berm area 19 of the containment area 10 and a planar portion covering the bottom of the containment area 10. The hazardous waste, solid waste, or fluid 11 contacts the water impermeable flexible plastic sheet or thermoplastic liner 13 constructed in accordance with the present invention.

Referring now to FIG. 1, in a preferred embodiment, the thermoplastic liner 13 is a uniform density material having an upper surface 14 and a lower surface 15 in contact with the containment area 10. The upper surface 14 is pigmented to reflect light and the remainder of the thermoplastic liner 13 is pigmented with, for example, carbon black, to prevent ultraviolet light induced damage. The reflective and non-reflective regions of the thermoplastic liner 13 are integrally bonded together. The uniform density thermoplastic liner or sheet 13 as shown in FIG. 1 contains a continuous water impermeable upper surface 14 of plastic containing a pigment which reflects sunlight sufficiently to minimize heat build-up m the surface area of the thermoplastic liner or sheet 13 that is exposed to direct sunlight.

The uniform density thermoplastic liner or multi-pigmented sheet 13 can be manufactured using standard thermoplastic techniques, such as, by co-extruding a light-reflective pigmented plastic with a dark-pigmented plastic so that the light-reflective phstic seamlessly bonds with the dark-pigmented plastic in laminar fashion to form a solid, continuous plastic sheet of a desired thickness containing an upper light-reflective surface 14 and an underside dark-pigmented surface 15. IT has been found that when the light-reflective pigment is added to a first laminar plastic stream, there is little cross-mixing of the light-reflective pigmented plastic stream into the dark-pigmented plastic stream.

Referring to FIG. 1, in a preferred embodiment, the hazardous waste site 10 is lined with a liner 13 comprising a uniform density plastic sheet material, such as high density polyethylene, which has been manufactured to contain an underside dark-pigmented surface 13 and an upper light reflective surface 14. The uniform density plastic sheeting 13 is then placed in the hazardous waste site 10 so that the light reflective surface 14 of the plastic sheeting 13 faces up towards the sun.

In another preferred embodiment, the uniform density plastic sheeting 13 is manufactured so that the upper surface 14 comprises approximately the outer ten percent (10%) to twenty percent (20%) of the overall thickness of the sheeting 13.

In another preferred embodiment, the upper surface 14 of the uniform density plastic sheeting 13 is pigmented with a white pigment, such as titanium oxide, while the underside dark-pigmented surface is pigmented with carbon black. In an alternative preferred embodiment, the upper surface 14 is pigmented with a material having a coefficient of reflection in the range of 0.05 to 1.0.

Additionally, in another preferred embodiment, the upper surface 14 of the plastic sheeting 13 is made rough or textured 18 to increase the light reflective capabilities of the sheeting 13 while also serving as a safety means for decreasing the slipperiness of the surface of the plastic sheeting 13.

In yet another preferred embodiment, the light reflectire upper surface of the liner is ultraviolet light stabilized with a Hindered Amine Light Stabilizer (HALS), such as the "Tinuvin 622" product offered by Ciba-Giegy, added to the plastic at a concentration of proximately 0.5% in the final product. Other suitable stabilizers could likewise be employed to advantage.

When using a HALS product to UV stabilize the outer layer, it is preferable to use a pigmentation other than titanium oxide white dye due to potential hinderance of the HALS performance when in the presence of titanium oxide dye.

It is surprising that the plastic sheeting 13 utilizing white pigmentation for approximately ten percent to twenty percent of the overall thickness of the sheeting actually prevents the undesirable heating effects associated with direct sunlight exposure to the sheeting. Additionally, the detection of tears, rips, cracks, perforations, punctures or other potential leak forming channels in the surface or seams of the plastic sheeting is enhanced by having the outer surface of the sheeting a light-pigmented color to contrast with any of the underlying dark-pigmented sheeting which may become exposed by virtue of any tears and the like. Furthermore, the presence of carbon black in the underlying layer serves to inhibit the formation of damaging free radicals or carbonyl groups in the polyethylene caused by exposure to ultraviolet light.

Referring now to FIG. 2, there is shown a multi-density, flexible liner in accordance with another preferred embodiment of this invention. In this preferred embodiment, the plastic sheet 13 of the liner is sirelist to that shown in FIG. 1 but differs in that it is constructed with a plurality of densities. The multi-density liner 13 of FIG. 2 comprises an upper surface 14, and a lower surface 15 in contact with the containment area 10. This liner additionally has a central core layer 21 located between the upper surface 14 and lower surface 15 of the liner 13. Similar to the uniform density embodiment of FIG. 1, the upper surfsre 14 of the multi-density liner of FIG. 2 is pigmented to reflect light.

The lower surfsee 15 of the multi-density liner is preferably darkly pigmented, but could also contain the same pigmentation as the upper surface 14. In a preferred embodiment of this multi-density liner, both the upper surface 14 and lower surfsee 15 are constructed from a HDPE material. However, a MDPE material, or polyethylene having a density greater than the central core Layer, could be used for the construction of the lower surface.

The multi-density liner 13 of FIG. 2 also comprises a central core layer 21 of a VLDPE material. In this preferred embodiment, the HDPE-VLDPE-HDPE layers are integrally bonded together and also can be constructed using standard thermoplastic techniques. It has been shown that the VLDPE core layer 21 has sufficient flexibility and ductility to stop any crack propagation which may occur in the upper light reflective layer 14 or lower layer 15 of the liner. Furthermore, the VLDPE layer 21 preferably contains a carboa black pigmentation to inhibit any ultraviolet induced degradation of the polyethylene. In preferred embodiment of this multi-density liner, the VLDPE layer is at least three times the thickness of each HDPE layer. For example, in a preferred embodiment, the multi-density liner is constructed having a 10 mil HDPE light pigmented layer 14, a 40 mil VLDPE core layer 21 and a 10 mil HDPE underside layer 15.

It is surprising that the combination of the HDPE-VLDPE-HDPE sandwich configuration along with the use of a light reflective pigmentation in the upper layer 14 enables the liner 13 to effectively resist the thermal stress cracking problems associated with the carbon black pigmented HDPE liners of the past. Although a light-reflective pigmented surface is not as U.V. stable as a carbon black pigmented surface, the combined use of an outer light reflective pigmented layer 14 of HDPE material reduces heat and increases chemical resistsace, while the more flexible core layer of U.V. stable carbon black dyed VLDPE prevents crack propagation and U.V. oxidative initiated degradation. The underside layer 15 of HDPE material also creates a strong chemically resistant layer. Thus, the combined attributes of each of the three Layers of the multi-density liner serve to overcome the stated disadvantages in existing liners employed in the waste containment industry.

Referring now to FIGS. 1 and 2, the uniform density or multi-density flexible plastic sheeting 13 of this invention can be employed to waterproof an area of soil by manufacturing or obtaining the flexible plastic sheet material 13 which has been manufactured to a desired certain thickness in accordance with this disclosure to contain in upper surface 14 capable of reflecting light. The soil to be waterproof is then covered with plurality of the light reflective flexible plastic sheets 13 with the upper light reflective surface 14 facing up. The sheets 13 are then aligned in an overlapped abutting fashion to create a seam region between adjoining sheen. The adjacent surfaces of the abutting sheets are roughened in the case of extrusion welding to increase adherence of cement or molten plastic used for the seams. Finally, the abutting sheets are permanently joined by techniques such as welding or cementing, in order to provide s continuous and uninterrupted water impervious barrier of plastic facing the area from which water is to be barred. The outer edge of the permanently joined sheets, or thermoplastic liner 13 is then secured to the ground around the perimeter of the thermoplastic liner 13 by known methods, such as, for example, burying the otter edge beneath the ground, embedding the outer edge within a wall of concrete surrounding the perimeter of the thermoplastic liner 13, or by other mechanical means of attachment, such as, constructing a concrete ring wall 20 around the perimeter of the containment area 10 and then attaching the outer edges of the thermoplastic liner 13 using standard techniques.

When approximately the outer ten percent (10%) to twenty percent (20%) of the thickness of the plastic sheeting is pigmented to create the upper fight reflective surface 14, the seaming technician can visually determine whether the upper layer 14 has been excessively abraded during roughening so as to comprise the strength of the sheet 13. This is because the appearance of the dark-pigmented material showing through from the layer below provides an indication that the roughening process has been excessive. The technician can then take corrective action, thereby preventing the incorporation of unseen defects in the liner.

Thus it is apparent that there has been provided, in accordance with the invention, a method and product that fully satisfies the objects, aims, and the advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims. For example, the multi-density embodiment of the present invention has been described as preferably utilizing the light pigmentation only in the layer facing the sun because it is more economical to introduce fight reflective pigmentation such as titanium oxide into only the upper layer of the liner while utilizing a less expensive carbon black-based pigment for the remainder of the liner. However, this invention is intended to cover all alternatives, such as, where both the upper and lower layers of the multi-density liner contain-light reflective pigmentation.

We claim:

1. A thermoplastic liner for outdoor fluid containment areas having a bottom and sidewalls comprising an inclined portion covering the sidewalls of said containment area and a planar portion covering the bottom of said containment area, raid thermoplastic liner having an upper surface and a lower surface in contact with said containment area, said upper surface being light reflective, said liner being adapted to sufficiently reflect incident radiation, reduce exposed liner temperature, and prevent adverse effects due to solar heating.

2. A thermoplastic liner as in claim 1, wherein said thermoplastic is constructed of a uniform density polyethylene having a density equal to or greater than 0.93 gm/cm$^3$.

3. A thermoplastic liner as in claim 1, where in said upper surface of said liner contains an ultraviolet light stabilizer.

4. A thermoplastic liner as in claim 1, wherein said thermoplastic is constructed of a multi-density composite, comprising an upper layer of polyethylene forming said upper surface and having a density equal to or greater than 0.93 grams/cm$^3$, a central core layer of polyethylene integrally bonded underneath said upper layer and having a density equal to or less than 0.92 grams/cm$^3$, and a lower layer of polyethylene forming said lower surface and being integrally bonded underneath said central core layer.

5. A uniform density thermoplastic liner as in claim 2, wherein said upper surface of said liner encompasses about ten percent (10%) of the overall thickness of said plastic liner.

6. A multi-density composite thermoplastic liner of claim 4, wherein skid upper and lower layers have the same thickness and the thickness of said central core layer is st least three times the thickness of said upper layer.

7. A multi-density composite thermoplastic liner of claim 4, wherein said upper and lower layers are 10 mil in thickness and said central core layer is 40 mil in thickness.

8. A multi-density composite thermoplastic liner of claim 4, wherein said lower polyethylene layer is constructed from polyethylene having a density equal to or greater than 0.93 grams/cm$^3$.

9. A multi-density composite thermoplastic liner of claim 4, wherein raid lower polyethylene layer is constructed from polyethylene having a density greater than 0.92 grams/cm$^3$.

10. A multi-density composite thermoplastic liner of claim 4, wherein said lower polyethylene layer is light reflective.

11. A multi-density composite thermoplastic liner of claim 4, wherein said central core layer contains carbon black in sufficient concentration to help prevent ultraviolet light oxidative initiated degradation.

12. A thermoplastic liner for outdoor fluid containment areas having a bottom and sidewalls comprising an inclined portion covering the sidewalls of said containment area and a planar portion covering the bottom of said containment area, said thermoplastic liner having an upper surface and a lower surface in contact with said containment area, said upper surface being light reflective, said liner being adapted to sufficiently reflect incident radiation, reduce exposed liner temperature, and prevent adverse effects due to solar heating, wherein said upper surface of raid liner is pigmented with white pigment.

13. A thermoplastic liner of claim 12, wherein said white pigment is a titanium oxide.

14. A thermoplastic liner of claim 12, wherein said upper surface covers a layer that is darker than said upper surface, so that damage to said upper surface is more apparent.

15. A thermoplastic liner for outdoor fluid containment areas having a bottom and sidewalls comprising an inclined portion covering the sidewalls of said containment area and s planar portion covering the bottom of said containment area, said thermoplastic liner having an upper surface and a lower surface in contact with said containment area, said upper surface being fight reflective, said liner being adapted to sufficiently relect incident radiation, reduce exposed liner temperature, and prevent adverse effects due to solar heating, wherein said upper surface of said liner is pigmented with a pigment having a coefficient of reflection between 0.5 and 1.0.

16. A thermoplastic liner of claim 15, wherein said upper surface covers a hyer that is darker than said upper surface, so that damage to said upper surface is more apparent.

17. A thermoplastic liner for outdoer fluid containment areas having a bottom and sidewalls comprising an inclined portion covering the sidewalls of said containment area and a planar portion covering the bottom of said containment area, said thermoplastic liner having an upper surface and a lower surface in contact with said containment area, said upper surface being light reflective, said liner being adapted to sufficiently reflect incident radiation, reduce exposed liner temperature, and prevent adverse effects due to solar heating, wherein said upper surface of said liner contains an ultraviolet light stabilizer employing a hindered amine.

18. A thermoplastic liner for outdoor fluid containment areas having a bottom and sidewalls comprising an inclined portion covering the sidewalls of said containment area and s planar portion covering the bottom of said containment area, said thermoplastic liner having an upper surface and a lower surface in contact with said containment area, said upper surface being light reflective and toughened, said liner being adapted to sufficiently reflect incident radiation, reduce exposed liner temperature, and prevent adverse effects due to solar heating.

19. A thermoplastic liner as in claim 18, wherein said upper surface of said liner is toughened by creating turbulence in said upper surface during manufacture thereby leaving aspirates in said upper surface.

20. A thermoplastic liner for outdoor fluid containment areas having a bottom and sidewalls comprising an inclined portion covering the sidewalls of said containment area and a planar portion covering the bottom of said containment area, said thermoplastic liner having an upper surface and a lower surface in contact with said containment area, wherein said thermoplastic liner is constructed of a multi-density composite, comprising an upper layer of polyethylene forming said upper surface and having a density equal to or greater than 0.93 grams/cm$^3$, a central core layer of polyethylene integrally bonded underneath said upper layer and having a density equal to or less than 0.92 grams/cm$^3$, and a lower layer of polyethylene forming said lower surface and being integrally bonded underneath said central core layer.

21. A multi-density composite thermoplastic liner of claim 20, wherein said upper and lower byers have the same thickness and the thickness of said central core layer is at least three times the thickness of said upper layer.

22. A multi-density composite thermoplastic liner of claim 20, wherein said upper and lower layers are 10 mil in thickness and said central core layer is 40 mil in thickness.

23. A multi-density composite thermoplastic liner of claim 20, wherein said lower polyethylene layer is constructed from polyethylene having a density equal to or greater than 0.93 grams/cm$^3$.

24. A multi-density composite thermoplastic liner of claim 20, wherein said lower polyethylene layer is constructed from polyethylene having a density greater than 0.92 grams/cm$^3$.

25. A multi-density composite thermoplastic liner of claim 20, wherein said central core layer contains carbon black in sufficient concentration to help prevent ultraviolet light oxidative initiated degradation.

26. A method for waterproofing an area of soil comprising the steps of: (a) forming a flexible plastic sheet including a means for reflecting light sufficiently to prevent damage to said sheet and soil from solar heating and ultraviolet and incident radiation comprising a plastic sheet material containing an upper surface capable of reflecting light and an underside surface;

(b) covering the soil to be waterproofed with a plurality of said flexible plastic sheets with said upper surface facing up;

(c) aligning said sheets in an abutting fashion to create a seam region between adjoining sheets; and (d) permanently joining said abutting sheets to provide a continuous and uninterrupted barrier of plastic facing the area from which water is to be barred.

27. A method as in claim 26, wherein said plastic sheet is formed from a uniform density polyethylene having a density equal to or greater than 0.93 grams/cm$^3$.

28. A method as in claim 26, wherein said upper surface of said liner is formed with a white pigment.

29. A method as in claim 26, wherein said upper surface of said liner is formed with a pigment having a coefficient of reflection between 0.5 and 1.0.

30. A method as in claim 26, wherein said upper surface of said liner is ultraviolet light stabilized.

31. A method as in claim 30, wherein said stabilizer is a Hindered Amine Light Stabilizer.

32. A method as in claim 26, wherein said upper surface of said liner is roughened.

33. A method as in claim 32, wherein said upper surface of said liner is toughened by creating turbulence in said upper surface during manufacture thereby leaving asperities in said upper surface.

34. A method as in claim 26, wherein said plastic sheet is formed from a multi-density composite, comprising an upper layer of polyethylene forming said upper surface and having a density equal to or greater than 0.93 grams/cm$^3$, a central core layer of polyethylene integrally bonded underneath said upper layer and having a density equal to or less than 0.92 grams/cm$^3$, and a lower layer of polyethylene forming said underside surface and being integrally bonded underneath said central core layer.

35. A method as in claim 27, wherein said upper surface of said liner encompssses about ten percent (10) of the overall thickness of said uniform density plastic liner.

36. A method as in claim 34, wherein said upper and lower layers are formed with the same thickness and the thickness of said central core layer is formed to be at least three times the thickness of said upper layer.

37. A method as in claim 34, wherein said upper and lower layers are formed to be 10 mil in thickness and said central core layer is formed to be 40 mil in thickhess.

38. A method as in claim 28, wherein said white pigment is a titanium oxide.

39. A method as in claim 34, wherein said lower polyethylene layer is constructed from polyethylene having a density equal to or greater than 0.93 grams/cm$^3$.

40. A method as in claim 34, wherein said lower polyethylene layer is constructed from polythylene having a density equal to or greater than 0.92 grams/cm$^3$.

41. A method as in claim 34, wherein said lower polyethylene layer is pigmented with a fight reflective material.

42. A method as in claim 34, wherein said central core layer is pigmented with carbon black in sufficient concentration to help prevent ultraviolet light oxidative initiated degradation.

43. A thermoplastic liner for outdoor fluid containment areas having a bottom and sidewalls comprising an inclined portion covering the sidewalls of said containment area and a planar portion covering the bottom of said containment area, said thermoplastic liner having an upper surface and a lower surface in contact with said containment area, said upper surface being light reflective, said liner being adapted to [sufficiently reflect incident radiation, reduce exposed liner temperature, and] prevent adverse effects due to solar heating, said upper surface having light reflective material mixed into thermoplastic liner material.

44. The liner of claim 43 wherein the upper surface is formed by coextruding a layer containing light reflective pigment onto another layer.

45. A method for waterproofing an area of soil comprising the steps of:

(a) forming a flexible plastic sheet [including a means for reflecting light sufficiently to prevent damage to said sheet and soil from solar heating and ultraviolet and incident radiation] comprising a plastic sheet material containing an upper surface capable of reflecting light and an underside surface; (b) forming said upper surface by mixing reflective material into the plastic sheet to form a reflective layer; (c) covering the soil to be waterproofed with a plurality of said flexible plastic sheets with said upper surface facing up; (d) aligning said sheets in an abutting fashion to create a seam region between adjoining sheets; and (e) permanently joining said abutting sheets to provide a continuous and uninterrupted barrier of plastic facing the area from which water is to be barred.

46. The method of claim 45 wherein said forming steps include the step of coextruding a plastic layer containing light reflective material onto another plastic layer.

* * * * *

UNITED STATES PATENT AND TRADEMARK OFFICE

CERTIFICATE OF CORRECTION

PATENT NO. : Re. 35,272

DATED : June 11, 1996

INVENTOR(S) : Michael C. Mathieson and Mark W. Cadwallader

It is certified that error appears in the above-indentified patent and that said Letters Patent is hereby corrected as shown below:

Item [57],

In the abstract, line 7 "cpable" should read --capable--.

Column 1, line 32, "bentonit-containing" should read --bentonite-containing--;

Column 1, line 64, "winkle" should read --wrinkle--.

Column 2, line 57, "posses" should read --possesses--.

Column 4, line 67, "sheet" should read --sheets--.

Column 6, line 1, "IT" should read --It--;

Column 7, line 22, "carboa" should read --carbon--;

Column 7, line 52, "in" (2nd occurrence) should read --an--.
Column 8, line 1, "otter" should read --outer--.
Column 8, line 10, "fight" should read --light--.
Column 8, line 32, "fight" should read --light--.
Column 8, claim 1, line 5, "raid" should read --said--.
Column 9, claim 6, line 2, "skid" should read --said--.
Column 9, claim 6, line 3, "st" should read --at--.
Column 9, claim 9, line 2, "raid" should read --said--.
Column 9, claim 12, line 10, "raid" should read --said--.
Column 9, claim 15, line 7, "fight" should read --light--.
Column 9, claim 15, line 8, "relect" should read --reflect--.
Column 9, claim 15, line 4, "s" should read --a--.
Column 9, claim 16, line 2, "hyer" should read --layer--.
Column 10, claim 18, line 3, "toughened" should read --roughened--.
Column 10, claim 19, line 2, "toughened" should read --roughened--.
Column 10, claim 21, line 2, "byers" should read --layer--.

UNITED STATES PATENT AND TRADEMARK OFFICE

CERTIFICATE OF CORRECTION

PATENT NO. : Re. 35,272

DATED : June 11, 1996

INVENTOR(S) : Michael C. Mathieson and Mark W. Cadwallader

It is certified that error appears in the above-indentified patent and that said Letters Patent is hereby corrected as shown below:

Column 11, claim 33, line 2, "toughened" should read --roughened--.
Column 11, claim 35, line 2, "encompsssses" should read --encompasses--.
Column 11, claim 43-46, the words should be italicized and the bracketed material should be moved.

Signed and Sealed this

Eighth Day of October, 1996

Bruce Lehman

*Attest:*

BRUCE LEHMAN

*Attesting Officer*

*Commissioner of Patents and Trademarks*